May 31, 1960
F. A. NEWBURN ET AL
2,938,482
SOLID PROPELLANT STARTER FOR LIQUID FUEL
MONOPROPELLANT TORPEDO PROPULSION SYSTEM
Filed May 31, 1956
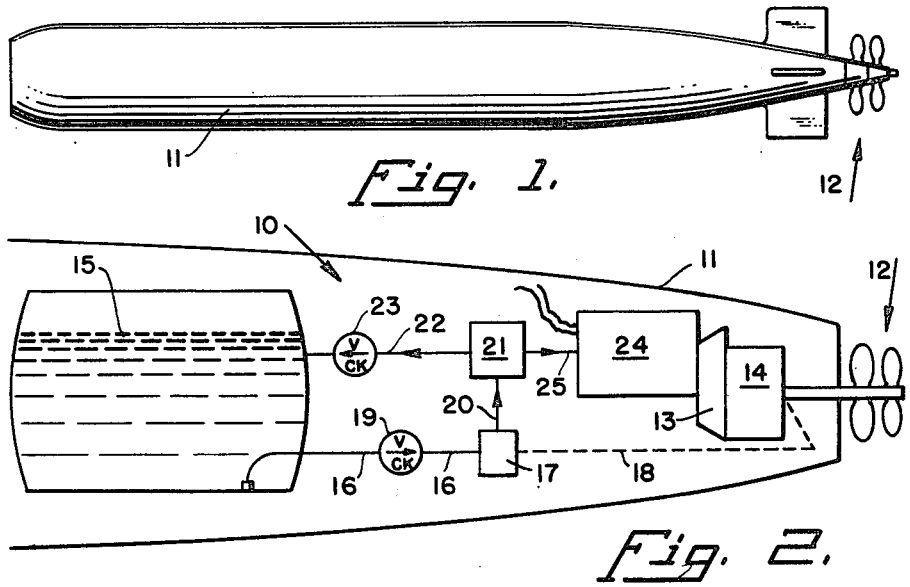
Fig. 1.
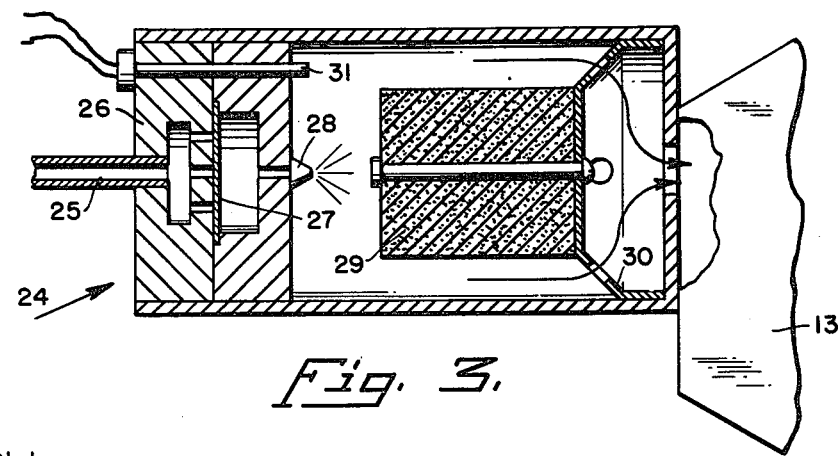
Fig. 2.
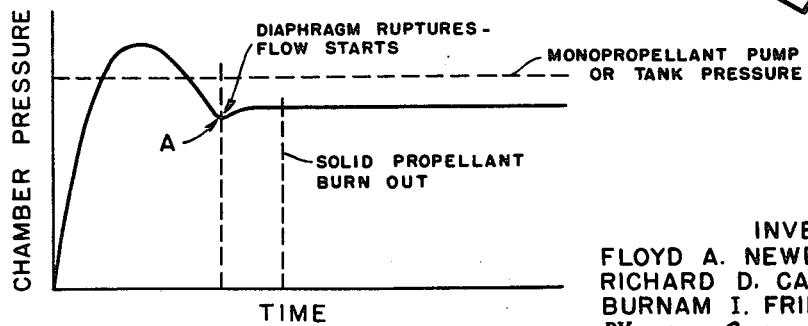
Fig. 3.
Fig. 4.
INVENTORS
FLOYD A. NEWBURN
RICHARD D. CANNOVA
BURNAM I. FRIEDMAN
BY
ATTORNEYS

2,938,482

SOLID PROPELLANT STARTER FOR LIQUID FUEL MONOPROPELLANT TORPEDO PROPULSION SYSTEM

Floyd A. Newburn, Woodland Hills, Richard D. Cannova, Pasadena, and Burnam I. Friedman, Sunnyvale, Calif., assignors to the United States of America as represented by the Secretary of the Navy Filed May 31, 1956, Ser. No. 588,579

1 Claim. (Cl. 114—20)

(Granted under Title 35, U.S. Code (1952), sec. 266)

The invention described herein may be manufactured and used by or for the Government of the United States of America for governmental purposes without the payment of any royalties thereon or therefor.

This invention relates to torpedoes and more particularly to improvements in propulsion system starting apparatus.

In certain torpedoes it has been the practice to operate a torpedo propulsion gas turbine or other external combustion type of prime mover by expansible gases produced by the decomposition of liquid monopropellant. In systems of this kind it is the practice to start the operation of the prime mover by a source of gas under pressure or a gas producing source to thereby accelerate it to operating speed after which the monopropellant is then injected into a decomposition chamber, the products of combustion from same then operating the prime mover. Since it is also the practice to operate the monopropellant supply pump from power derived from the prime mover it will be apparent that the prime mover must be operating at proper speed before the combustion process of the monopropellant may occur.

One of the objects of the invention is to provide improvements in apparatus of the type just referred to and more particularly to apparatus employing a single chamber containing a solid propellant which serves to start the prime mover and also to ignite the liquid propellant injected into the chamber.

Another object is to employ a solid propellant which will quickly attain a peak pressure in the chamber and as it thereafter burns retrogressively permit injection of a liquid monopropellant into the chamber through a burst or rupture diaphragm and thereby attain smooth transition of operation of the prime mover from solid propellant gases to liquid propellant gases.

Another object is to associate the solid propellant and injected liquid propellant in such manner that ignition of the latter occurs without delay and without so called "hard starts."

Other objects, advantages and salient features will become more apparent from the description to follow, the appended claim and the accompanying drawing in which:

Fig. 1 is a side elevation of a torpedo adapted to be propelled by the subject of the invention, Fig. 2 diagrammatically illustrates the subject of the invention, Fig. 3 is an enlarged section detail of a portion of Fig. 2, and Fig. 4 is a pressure-time chart of decomposition chamber conditions.

Referring in detail to the drawing the subject of the invention comprises propulsion apparatus 10 disposed within a conventional torpedo 11 and connected to one or more propellers 12 for rotating same to thereby propel the torpedo through the water.

Propulsion apparatus 10 comprises a turbine or other prime mover 13 operatively connected to a speed reduction gear train 14, the latter being operatively connected to propellers 12 for rotating same in opposite directions, these components of the propulsion system being conventional and well known in the art.

A suitable tank 15 contains the monopropellant and is connected by a supply conduit 16 to propellant pump 17 driven by any suitable power take-off shaft or the like 18 connected to the prime mover 13 and gear train 14, a check valve 19 being provided in conduit 19 to prevent flow of the monopropellant therein in a direction back to the tank. The discharge of pump 17 is connected by a conduit 20 to flow control valve 21 which may return liquid to tank 15 through conduit 22 and check valve 23 and deliver liquid to the decomposition chamber 24 through conduit 25.

Referring to Fig. 3 decomposition chamber 24 is provided at one end with a closure 26 which contains a one way rupture diaphragm 27 adapted to rupture when the pressure in conduit 25 exceeds the pressure within chamber 24 by a predetermined value but which will not rupture when the pressure in chamber 24 exceeds pressure in conduit 25. As shown, this is a thin metal plate which covers a plurality of apertures in the closure, the pressure in which may act upon the entire area of one side of the plate to rupture it when pressure in conduit 25 exceeds the pressure in chamber 24. When the excess pressure is in the opposite direction the plate is supported against rupture except over the relatively small cross sectional areas of the apertures, the plate being capable of withstanding considerably greater pressure in this direction against rupture. A suitable nozzle 28 communicates with conduit 25 after the diaphragm ruptures and permits the liquid to spray from same in an outwardly direction along the surface of a cone. A solid non-inhibited propellant 29 is carried by a support 30 disposed at the other end of the chamber, the latter being suitably apertured to permit gases to flow to the turbine or other prime mover 13. An electrical igniter 31 is carried by closure 26 and upon application of an electric current thereto initiates burning of propellant 29.

In the operation of the invention so far described the torpedo is launched in any well known manner and in response to an inertia sensing device or water depth device current is applied to igniter 31 which initiates burning of solid propellant 29. The latter is of such composition and size to burn within 1 to 2 seconds and produces gas sufficient to bring the turbine or other prime mover up to operating speed. As shown in Fig. 4, the pressure quickly reaches a peak and then decreases to point A at which the pump 17 is now delivering fluid at a pressure sufficient to rupture diaphragm 27 whereupon fluid is sprayed into the flame produced by the propellant, igniting the latter. The retrogressive burning propellant burns out shortly after ignition and the liquid propellant continues to decompose under substantially constant pressure as shown in Fig. 4.

In some torpedoes it is desirable to supply the liquid monopropellant to the decomposition chamber without the use of a power driven pump such as pump 17. For installations of this type the propellant tank may be pressurized by any suitable gas, preferably an inert gas, to such pressure to provide flow to the decomposition chamber.

The liquid monopropellant may be normal propyl nitrate, ethylene oxide or any other liquid which will decompose after being initiated by an ignition flame. The solid propellant is preferably a double base powder containing principally nitrocellulose and nitroglycerin.

Obviously many modifications and variations of the present invention are possible in the light of the above teachings. It is therefore to be understood that within the scope of the appended claim the invention may be practiced otherwise than as specifically described.

What is claimed is:

In a torpedo of the type having a propeller driven propulsion system including an external combustion prime mover adapted to be operated by decomposition gases of a liquid monopropellant, and a decomposition chamber in which said gases may be formed, the improvements, in combination, wherein said decomposition chamber contains a solid propellant with exposed surfaces uninhibited against burning, whereby the burning area of the solid propellant decreases as it burns, means for initiating combustion of the solid propellant, a liquid monopropellant supply, a monopropellant pump mechanically driven by said propulsion system communicating the monopropellant supply with means for injecting the monopropellant into the decomposition chamber and into proximity with the burning solid propellant, rupture means, such as a rupture diaphragm, adapted to prevent flow of monopropellant to the decomposition chamber until the decomposition chamber pressure produced by the solid propellant decreases to a value below the pump pressure, at which time said rupture means is adapted to permit flow of the monopropellant to the decomposition chamber, the solid propellant adapted to continue burning after flow of monopropellant to the decomposition chamber is initiated for a sufficient time to produce effective ignition of the monopropellant.

References Cited in the file of this patent

UNITED STATES PATENTS

| | | |
|---|---|---|
| 1,302,162 | Hesse | Apr. 29, 1919 |
| 2,405,932 | Alderman | Aug. 20, 1946 |
| 2,676,456 | Holzworth | Apr. 27, 1954 |
| 2,711,630 | Lehman | June 28, 1955 |
| 2,733,569 | Trowbridge | Feb. 7, 1956 |
| 2,743,576 | Crockett | May 1, 1956 |
| 2,842,937 | Clark | July 15, 1958 |

FOREIGN PATENTS

| | | |
|---|---|---|
| 590,177 | Great Britain | July 10, 1947 |